US011039199B2

(12) United States Patent
Harish

(10) Patent No.: US 11,039,199 B2
(45) Date of Patent: Jun. 15, 2021

(54) MEDIA CONTINUITY SYSTEM

(71) Applicant: SLING MEDIA L.L.C., Foster City, CA (US)

(72) Inventor: Yashaswini Harish, Foster City, CA (US)

(73) Assignee: SLING MEDIA L.L.C., Foster City, CA (US)

(*) Notice: Subject to any disclaimer, the term of this patent is extended or adjusted under 35 U.S.C. 154(b) by 0 days.

(21) Appl. No.: 15/922,743

(22) Filed: Mar. 15, 2018

(65) Prior Publication Data

US 2019/0208256 A1    Jul. 4, 2019

Related U.S. Application Data

(60) Provisional application No. 62/611,959, filed on Dec. 29, 2017.

(51) Int. Cl.
*H04N 21/43* (2011.01)
*H04N 21/433* (2011.01)
(Continued)

(52) U.S. Cl.
CPC ..... *H04N 21/4302* (2013.01); *H04L 65/4076* (2013.01); *H04L 65/604* (2013.01);
(Continued)

(58) Field of Classification Search
CPC ........... H04N 21/4302; H04N 21/4363; H04N 21/8547; H04N 21/43615; H04L 65/4084
(Continued)

(56) References Cited

U.S. PATENT DOCUMENTS 8,931,019 B2 * 1/2015 Hirano ............. H04N 21/41407
725/88
2005/0163476 A1 * 7/2005 Kosugi ..................... H04N 5/76
386/216
(Continued)

FOREIGN PATENT DOCUMENTS

GB            2500746 A      10/2013

OTHER PUBLICATIONS

DVB Organization: "HbbTV—SPEC20-0002-001-HbbTV_2.0.2_specification_for_publication_changes_marked_wrt_2.0 pdf", DVB, Digital Video Broadcasting, C/O EBU—17A Ancienne Route—CH-1218 Grand Saconnex, Geneva—Switzerland, Jul. 5, 2016.

(Continued)

*Primary Examiner* — Alfonso Castro
(74) *Attorney, Agent, or Firm* — Lorenz & Kopf, LLP

(57) ABSTRACT

A set-top box and a method of operating the same are provided. The set-top box, for example, may include, but is not limited to, a communication system configured to receive media content from a broadcast content source and communicate with a personal electronic device, and a media continuity system configured to receive, from the communication system, an indication that a user is watching media content through an over the top source on the personal electronic device, buffer the media content from the broadcast content source in a memory, determine, when the set-top box receives a request to play the media content, a difference between a timestamp associated with the media content as broadcast by the over the top source and the media content as broadcast by the broadcast content source, and output the media content using the buffer based upon the difference in the timestamp when the user returns home.

20 Claims, 2 Drawing Sheets

Figure 1:
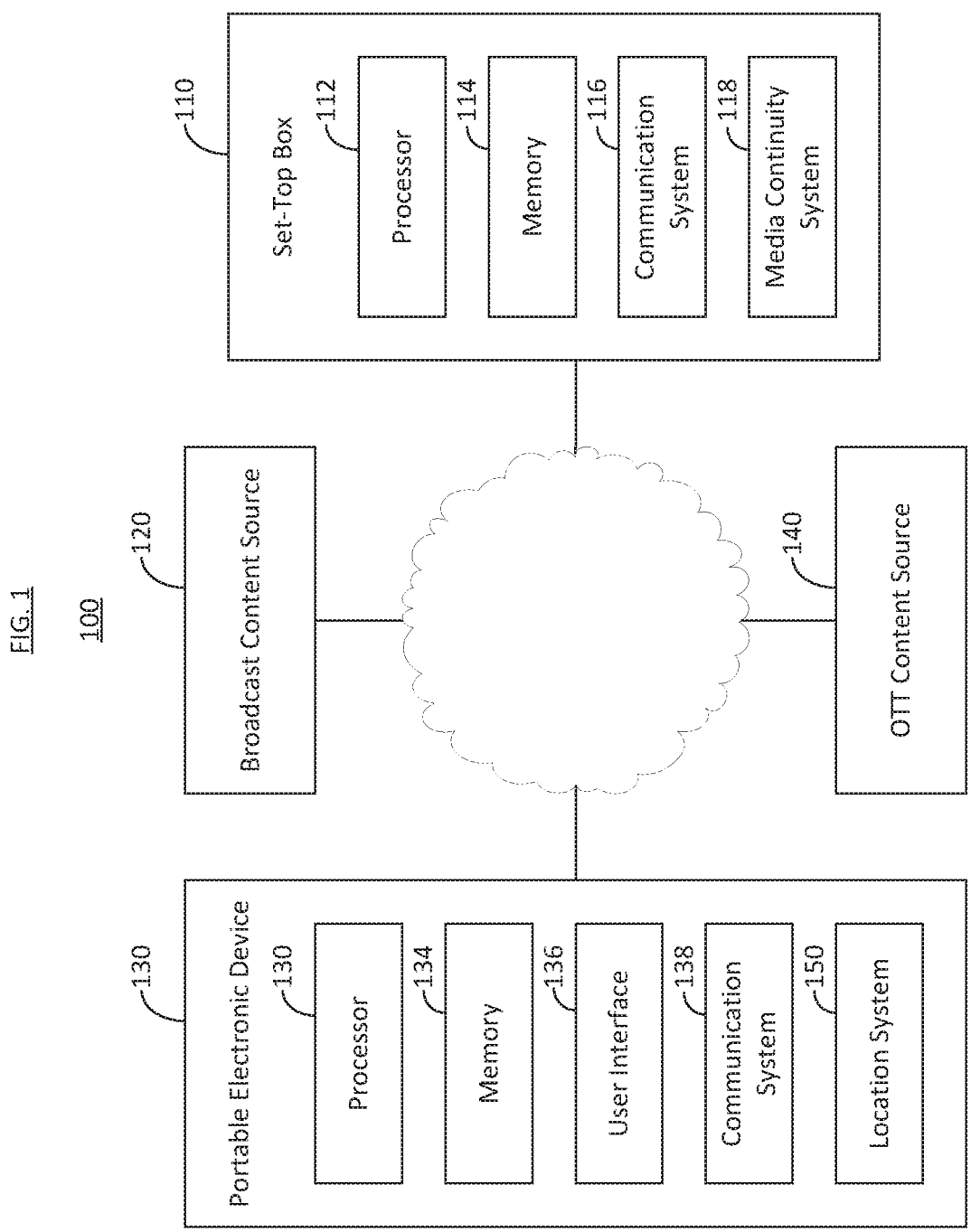

(51) Int. Cl.
  *H04N 21/81* (2011.01)
  *H04N 21/61* (2011.01)
  *H04L 29/06* (2006.01)
  *H04N 21/436* (2011.01)
  *H04N 21/4363* (2011.01)
  *H04N 21/8547* (2011.01)
  *H04N 21/462* (2011.01)

(52) U.S. Cl.
  CPC ......... *H04L 65/80* (2013.01); *H04N 21/4307* (2013.01); *H04N 21/4331* (2013.01); *H04N 21/4363* (2013.01); *H04N 21/43615* (2013.01); *H04N 21/6112* (2013.01); *H04N 21/6125* (2013.01); *H04N 21/6143* (2013.01); *H04N 21/812* (2013.01); *H04N 21/8547* (2013.01); *H04L 65/4084* (2013.01); *H04N 21/4622* (2013.01)

(58) Field of Classification Search
  USPC ........................................................ 725/116
  See application file for complete search history.

(56) References Cited

U.S. PATENT DOCUMENTS

| | | | | |
|---|---|---|---|---|
| 2008/0163330 | A1* | 7/2008 | Sparrell | H04M 11/007 725/142 |
| 2010/0146573 | A1* | 6/2010 | Richardson | H04H 60/80 725/110 |
| 2011/0307930 | A1* | 12/2011 | Rouse | H04N 21/2387 725/98 |
| 2012/0084803 | A1* | 4/2012 | Johansson | H04N 21/23106 725/25 |
| 2013/0031222 | A1* | 1/2013 | Molander | H04N 21/23439 709/219 |
| 2013/0254828 | A1* | 9/2013 | Reimers | H04N 21/2385 725/134 |
| 2014/0109144 | A1* | 4/2014 | Asnis | H04N 21/43615 725/48 |
| 2014/0189139 | A1* | 7/2014 | Cheng | H04L 65/60 709/231 |
| 2014/0344848 | A1* | 11/2014 | Busse | H04N 21/4122 725/28 |
| 2015/0030022 | A1 | 1/2015 | Mantin | |
| 2016/0365126 | A1* | 12/2016 | Dalimba | G11B 27/3081 |
| 2016/0366468 | A1* | 12/2016 | Seo | H04N 21/4126 |

OTHER PUBLICATIONS

Bassbouss Louay et al., "Towards A Wake-up And Synchronization Mechanism For Multiscreen Application Using iBeacon", 2014 International Conference on Signal Processing and Multimedia Applications (SIGMAP), SCITEPRESS, Aug. 28, 2014, pp. 67-72, XP032924918, [retrieved on Jul. 15, 2016].

Boronat, Fernando et al., "HbbTV—Compliant Patform For Hybrid Media Delivery And Synchronization On Single-and Multi-Device Scenarios", IEEE Transactions On Broadcasting, IEEE Service Center, Piscataway, NJ, US, vol. 64, No. 3, Sep. 1, 2018, pp. 721-746, XP011688203, ISSN: 0012-9316, DOI: 10. 1109/TBC. 2017.2781124 [retrieved on Aug. 7, 2018].

* cited by examiner

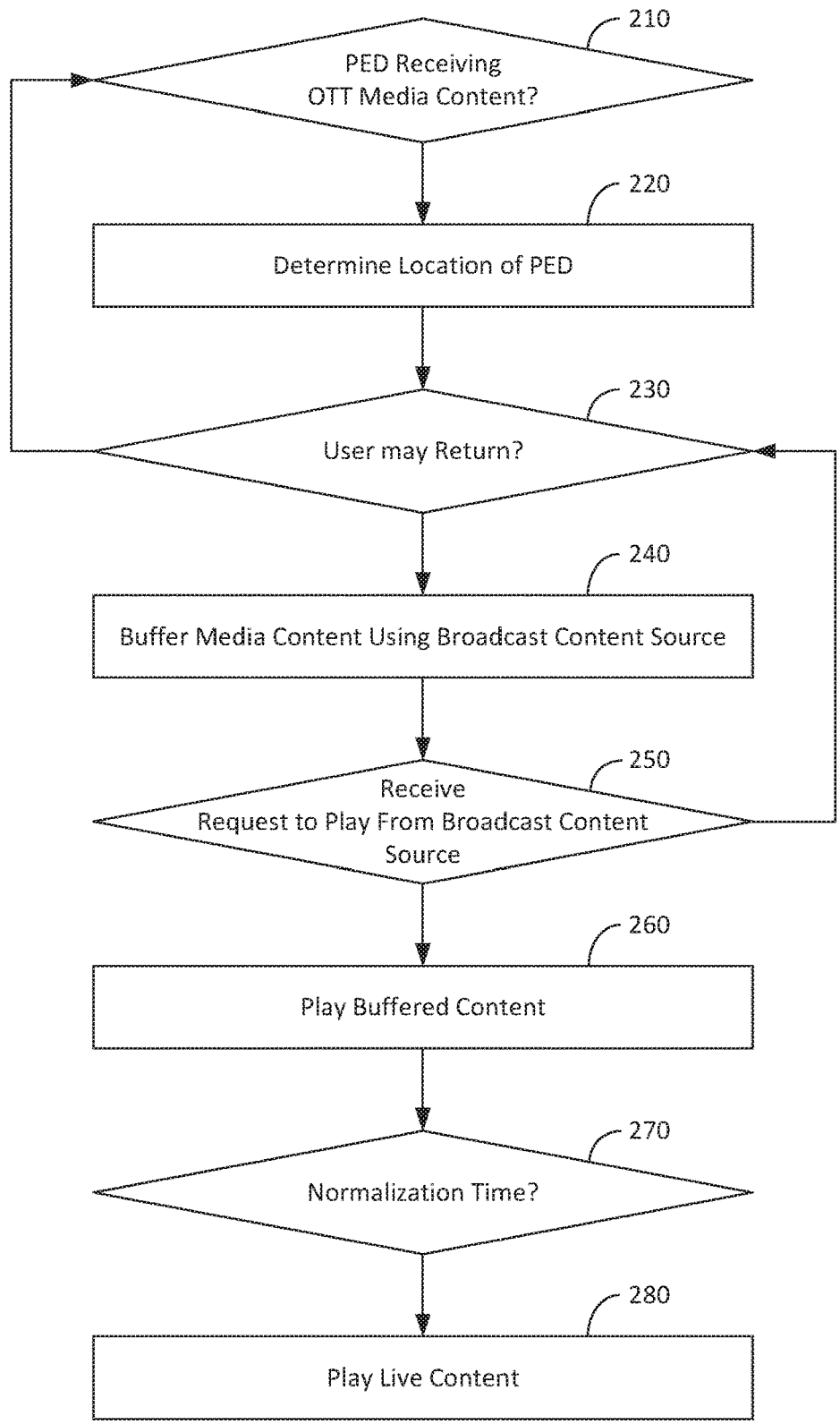

MEDIA CONTINUITY SYSTEM

PRIORITY

This application is a continuation of Provisional U.S. Patent Application Ser. No. 62/611,959, which was filed on Dec. 29, 2017 and is incorporated herein by reference.

TECHNICAL FIELD

The following relates to set-top boxes, and more particularly to maintaining timing continuity between a media feed to a set-top box and a media feed to a portable electronic device.

BACKGROUND

The consumption of media, such as television, movies, music and the like is increasing. With the prevalence of portable electronic devices, such as cellular phones and tablet computers, users are demanding that content they are consuming in their homes be available to them when they are away from their homes.

SUMMARY

In one embodiment, for example, a set-top box is provided. The set-top box may include, but is not limited to, a communication system configured to receive media content from a broadcast content source and communicate with a personal electronic device, and a media continuity system configured to receive, from the communication system, an indication that a user is watching media content through an over the top source on the personal electronic device, buffer the media content from the broadcast content source in a memory, determine, when the set-top box receives a request to play the media content, a difference between a timestamp associated with the media content as broadcast by the over the top source and the media content as broadcast by the broadcast content source, and output the media content using the buffer based upon the difference in the timestamp when the user returns home.

In another embodiment, for example, a method of operating a set-top box is provided. The method may include, but is not limited to, receiving, from a communication system, media content from a broadcast content source, receiving, by a media continuity system from the communication system, an indication that a user is watching media content through an over the top source on the personal electronic device, buffering, by the media continuity system, the media content from the broadcast content source, determining, by the media continuity system, a difference between a timestamp associated with the media content as broadcast by the over the top source and the media content as broadcast by the broadcast content source when the set-top box receives a request to play the media content, outputting, by the media continuity system, the media content using the buffer based upon the difference in the timestamp when the user returns home.

DESCRIPTION OF THE DRAWING FIGURES

Exemplary embodiments will hereinafter be described in conjunction with the following drawing figures, wherein like numerals denote like elements.

FIG. 1 is a block diagram of a media system, in accordance with an embodiment; and FIG. 2 is a flow diagram illustrating an exemplary 200 for operating the media system, in accordance with an embodiment.

DETAILED DESCRIPTION

According to various exemplary embodiments, a set-top box having a media continuity system is provided. The media continuity system determines a time difference between media content broadcast to a user's home via a satellite, cable or the like, and media content broadcast to a user's cell phone or other portable electronic device via an internet based connection and normalizes the time difference when a user switches between the two broadcast methods, thereby preventing the user from missing content.

FIG. 1 is a block diagram of a media system 100, in accordance with an embodiment. The media system 100 includes a set-top box 110. The set-top box 110 includes a processor 112 and a memory 114. The processor 112 may be a central processing unit (CPU) a graphics processing unit (GPU), an application specific integrated circuit (ASIC), a microcontroller, a field programmable gate array (FPGA), or any other logic circuit or combination thereof. The memory 114 may be any combination of volatile and non-volatile memory. In one embodiment, for example, a portion of the memory 114 may be a cloud based memory. The set-top box 110 may access one or more remote memory devices for some media content. While not illustrated in FIG. 1, the set-top box may output media content to a television or other display in the home or business of a user.

The set-top box 110 further includes a communications system 116. The communications system 116 may receive broadcast media content from a broadcast content source 120. The broadcast media content may be, for example, satellite broadcast media, cable broadcast media, telephone-based broadcast media, fiber cable broadcast media, antenna based broadcast media, or the like, or any combination thereof.

In order to provide a more complete media service to a user, the broadcast content source 120 may allow portable electronic devices (PEDs) 130 to view the broadcast media content. The PEDs 130 may be, for example, a cellular phone, a tablet computer, a laptop computer, a wearable electronic device, or the like, or any combination thereof.

The PED 130 includes a processor 132 and a memory 134. The processor 132 may be a central processing unit (CPU) a graphics processing unit (GPU), an application specific integrated circuit (ASIC), a microcontroller, a field programmable gate array (FPGA), or any other logic circuit or combination thereof. The memory 134 may be any combination of volatile and non-volatile memory. In one embodiment, for example, a portion of the memory 134 may be a cloud based memory. The PED 130 may access the one or more remote memory devices to store/retrieve data such as videos, pictures, music or the like.

The PED 130 further includes a user interface 136. The user interface may include one or more of a display for displaying media, one or more speakers for playing audio, a headphone jack, one or more hard input buttons, a touch screen display, a scroll wheel, or the like, or any combination thereof.

The PED 130 further includes a communication system 138. The communication system 138 may include one or more of a cellular communication system, a Bluetooth communication system, a Wi-Fi communication system, or any other wired or wireless communication systems, or any combination thereof.

In order for the broadcast content source 120 to provide the broadcast media content to the PED 130, the broadcast content source 120 may transmit the media content to an over-the-top (OTT) source 140. The OTT source 140 transcodes the media content and utilizes the internet to transmit the transcoded media content to the PED 130.

Because the broadcast content source 120 first has to transmit the media content to the OTT source 140 and because the OTT source 140 has to transcode the media content prior to making the media content available via the internet, there is a delay between when the broadcast media content is available for viewing through the set-top box 110 and when the transcoded media content is available for viewing through the PED 130. The delay may be, for example, up to forty seconds or possibly more. The delay would be unnoticeable to a user unless they are watching a program on the PED 130 away from their home or business, then return home and attempt to resume watching the program through the set-top box 110. In other words, when the user switches between receiving the media through the OTT source 140 and the broadcast content source 120, the user may experience a time jump in the media content according to the time of the delay, thus missing part of the content. The missing content can be undesirable, for example, when the user is watching a sporting program.

In order to improve the user experience with the media system 100 and to prevent the user from missing content, the set-top box further includes a media continuity system 118. The media continuity system 118 may be executed by the processor 112 and memory 114 of the set-top box 110, or may be executed by hardware dedicated to the media continuity system 118. The media continuity system 118 may determine when the user is watching broadcast content on the PED 130 and buffer a predetermined amount of the media content from the broadcast content source 120, as discussed in further detail below.

In one embodiment, for example, a location of the PED 130 relative to the user's home or business may be used to determine when the media continuity system 118 buffers the data. In this embodiment, the PED 130 may include a location system 150. The location system 150 may include, for example, a global position system (GPS) receiver which calculates the PED's position. In another embodiment, for example, the PED may utilize triangulation relative to multiple cellular towers or other known transceivers (e.g., WIFI hotspots or the like) to determine the position of the PED 130.

FIG. 2 is a flow diagram illustrating an exemplary method 200 for operating the media system 100, in accordance with an embodiment. The method begins when the media continuity system 118 determines that the PED is receiving media content broadcast by the OTT source 140. (Step 210). In one embodiment, for example, the PED 130 may transmit a signal via the communication system 138 to the communication system of the set-top box 110 to inform the set-top box 110 as to the media content the PED 130 is receiving. In another embodiment, for example, the OTT source 140 may transmit a signal to the set-top box 110 to inform the set-top box 110 as to the media content the PED 130 is receiving.

In one embodiment, for example, the media continuity system 118 may optionally determine a location of the PED 130. (Step 220). If the PED 130 is, for example, hundreds of miles from the location of the set-top box 110, there would no chance that the user would be switching to the broadcast content source 120, thus negating the need for the media continuity system 118 to buffer the media content. However, given that the delay between the broadcast content source 120 and the OTT source 140 is generally minimal (i.e., less than a minute), the space in the memory 114 required to buffer enough media content to eliminate any content loss is minimal. Accordingly, the media continuity system 118 may optionally always buffer the media content that the PED 130 is viewing, as discussed in further detail below.

The media continuity system 118 may determine the location of the PED 130 in numerous ways. In one embodiment, for example, the PED 130 may view the media content using an application installed on the PED 130. When a user of the PED 130 is watching content using the OTT source 140, the application may periodically, or upon request by the media continuity system 118, transmit location information to the set-top box 110 via the respective communication systems 116 and 138. As discussed above, the PED 130 may determine the location of the PED 130 using the location system 150.

The media continuity system 118, based upon the location of the PED 130, may determine if the user may return home. (Step 230). The media continuity system 118 may determine that the user may return home when the PED 130 is within a predetermined distance from the location of the set-top box 110, for example, one mile. In one embodiment, for example, the location system 150 of the PED 130 or the media continuity system 118 may determine a direction of travel of the PED 130. In this embodiment, the media continuity system 118 may determine if the user may return home when the PED 130 is within the predetermined distance from the location of the set-top box 110 and traveling in a direction of the set-top box 110.

When the media continuity system 118 optionally determined that the user may return home in Step 230, or after the media continuity system 118 determines that the PED is receiving media content from the OTT source 140 in Step 210, the media continuity system 118 begins to buffer the same media content as broadcast by the broadcast content source 120. (Step 240). The size of the buffer may depend, for example, upon the delay between the broadcast content source 120 and the OTT source 140. For example, the PED 130, when transmitting location information in Step 220 or when the PED 130 or OTT source 140 inform the media continuity system 118 that the PED 130 is receiving content in Step 210, may transmit a timestamp associated with the media content. In this embodiment, the media continuity system 118 may compare a timestamp associated with the media content as broadcast by the broadcast content source 120 with the timestamp associated with the media content as broadcast by the OTT source 140. The size of the buffer may then be selected dynamically to be greater than the delay. However, the size of the buffer may also have a fixed value based upon historical delay values.

The media continuity system 118 then determines when the set-top box 110 receives a request to play the media content. (Step 250). The media continuity system 118 may determine that the set-top box 110 receives the request to play the media content, for example, when the PED 130 connects to the same local area network as the set-top box 110. The PED 130 may be configured to receive content from the broadcast media source 120 through the set-top box when the PED 130 is on the same local area network as the set-top box 110 and through the OTT source 140 when away from the local area network. Accordingly, when the PED 130 returns to the local network, the PED 130 may automatically switch to receiving the content from the broadcast media source 120 through the set-top box, resulting in the request. In another embodiment, for example, the media continuity system 118 may determine that the set-top box 110 has received the request to play the media content when the user powers on or otherwise interacts directly with the set-top box 110. In one embodiment, for example, the set-top box may automatically begin outputting the media content that was being played on the PED 130 when the user powers on or otherwise interacts directly with the set-top box 110. Typically the set-top box 110 may be configured to output media from the channel that was last viewed. However, by switching to a channel corresponding to the media content being played on the PED 130 and playing from the buffer, the user may begin watching the media content more quickly, improving the overall user experience.

When the media continuity system 118 determines that the user has returned home, the media continuity system 118 instructs either the set-top box 110, or if the user continues to watch the content on the PED 130, to access the media content from the buffer in the set-top box 110 rather than the live feed from the broadcast content source 120. (Step 260). This ensures that the user can continue watching the media content on either device from the same point in time as the user was watching the media content while away from home, thereby preventing any gaps in the media content due to the different sources of the media content.

In one embodiment, for example, the media continuity system 118 may attempt to bring the user back to the live content feed from the broadcast content source 120, rather than continue to extract data from the buffer. In this embodiment, for example, the media continuity system 118 may determine if any of the media content can be normalized. (Step 270). The media content is normalized by fast forwarding through certain parts of the media content, or skipping part of the media content entirely. In one embodiment, for example, the media continuity system 118 may determine if the media content stored in the buffer includes one or more commercials. When a commercial is stored in the buffer, the media continuity system 118 may thus skip or fast forward through the commercial. When a timestamp of the media content as watched by the user matches a time stamp of the live feed, the media continuity system 118 instructs the PED 130 or the set-top box 110 to display the media content as broadcast by the broadcast media content 120. (Step 280). Accordingly, the media continuity system 118 advantageously improves the media system by preventing gaps in the media content when a user switches from remotely watching the content to watching the content from their home, but also normalizes the media content with the live feed as soon as possible such that the user is eventually watching the media content in real time, thereby improving the user's overall experience.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A set-top box, comprising:
   a communication system configured to receive a live feed of media content from a broadcast content source and communicate with a personal electronic device; and
   a media continuity system configured to:
      receive, from the communication system, an indication that a user is currently watching a live feed of the media content through an over the top source other than the broadcast content source on the personal electronic device;
      in response to the indication, automatically obtain the live feed of the same media content that the user is currently watching from the broadcast content source and begin to store a copy of the obtained live feed of the media content from the broadcast content source in a data storage for later viewing;
      determine a difference between a timestamp associated with the live feed of the media content as broadcast by the over the top source and a timestamp associated with the live feed of the media content as broadcast by the broadcast content source; and
      when the set-top box subsequently receives a request to play the live feed of the media content while the live feed of the media content is still being broadcast, output the copy of the media content previously stored in the data storage beginning at a playback point that is selected based upon the determined difference in the timestamps to thereby preserve continuity in playback between the live feed of the media content through the over the top source and the copy of the media content stored in the memory.

2. The set-top box of claim 1, wherein the set-top box is connected to a local area network and the media continuity system receives the request to play the live feed of the media content when the personal electronic device joins the local area network.

3. The set-top box of claim 1, wherein the media continuity system receives the request to play the live feed of the media content and switches to a channel corresponding to the media content when the set-top box is powered on.

4. The set-top box of claim 1, wherein the media continuity system is further configured to:
   determine when the user may return to a location of the set-top box,
   wherein the media continuity system only stores the media content in the memory when the user may return to the location of the set-top box.

5. The set-top box of claim 4, wherein the media continuity system determines when the user may return to a location of the set-top box when the personal electronic device is within a predetermined distance of the set-top box.

6. The set-top box of claim 1, wherein the media continuity system is further configured to:
   determine, when outputting the media content from the buffer, when content in the memory may be skipped; and
   normalize the output of the set-top box to a live broadcast of the media content when the content in the buffer may be skipped.

7. The set-top box of claim 6, wherein the media continuity system determines that content in the memory may be skipped when the content includes commercials.

8. A method of operating a set-top box that receives media content from a broadcast source, the method comprising:
   receiving, by the set top box, an indication that a user is watching a particular program of the media content on the personal electronic device from an over the top source that is different from the broadcast content source;

based upon the indication, the set-top box automatically receiving a live broadcast of the particular program of the media content from the broadcast content source and automatically beginning to buffer the particular program for later playback;

determining, by the media continuity system, a difference between a timestamp associated with the media content as broadcast by the over the top source and the same media content as the live broadcast by the broadcast content source when the set-top box subsequently receives a request to play a live feed of the media content during the live broadcast by the broadcast content source; and when the set-top box subsequently receives the request to play the media content, the set top box outputting the previously-buffered media content from the live broadcast beginning at a playback point that is selected by the set top box based upon the determined difference to thereby adjust the continuity in playback between the live feed of the media content from the over the top source and the copy of the media content stored in the memory.

9. The method of claim 8, further comprising receiving, by the set top box, the request to play the live feed of the media content automatically from the personal electronic device when the personal electronic device joins a local area network that the set-top box is connected to.

10. The method of claim 8, further comprising receiving, by the set top box, the request to play the live feed of the media content automatically from the set-top box when the set-top box is powered on.

11. The method of claim 10, further comprising, switching the set-top box to a channel corresponding to the media content when the set-top box is powered on.

12. The method of claim 8, wherein a size of the buffer is based upon a difference in the timestamp associated with the media content as broadcast by the over the top source and the media content as broadcast by the broadcast content source.

13. The method of claim 8, further comprising:
determining, by the set top box, when the user may return to a location of the set-top box,
wherein the media continuity system only buffers the media content in the memory when the user may return to the location of the set-top box.

14. The method of claim 13, wherein the set top box determines when the user may return to a location of the set-top box when the personal electronic device is within a predetermined distance of the set-top box.

15. The method of claim 8, further comprising:
determining, by the set top box, when content in the buffer may be skipped when outputting the media content from the buffer; and normalizing the output of the set-top box to a live broadcast of the media content when the content in the buffer may be skipped.

16. The method of claim 15, wherein the set top box determines that content in the buffer may be skipped when the content includes commercials.

17. An automated process performed by a television receiver device that receives television programs from a broadcast source, the automated process comprising:
receiving a signal that a user is watching a particular program on a personal electronic device, wherein the personal electronic device receives the particular program from an over the top source that is different from the broadcast source;

in response to the signal, the set-top box automatically tuning to receive a live broadcast containing the same particular program from the broadcast content source and automatically beginning to record a copy of the live broadcast containing the particular program in a data storage for later playback of the particular program;

after recording the copy of the broadcast, the set-top box subsequently receiving an instruction to provide the particular program by the television receiver device, wherein the instruction comprises a timestamp of the particular program based upon the viewing of the particular program received by the personal electronic device from the over the top source, and wherein the instruction is received while the live broadcast of the same particular program is continuing; and outputting, by the television receiver device, the copy of the particular program that was previously automatically buffered in the data storage, wherein the copy of the particular program is outputted for playback from the previously-recorded copy of the broadcast containing the particular program beginning at a start point that is adjusted based upon the timestamp of the particular program received in the instruction to thereby preserve continuity in playback between the live feed of the particular program from the over the top source and the copy of the particular program buffered in the data storage.

18. The automated process of claim 17 wherein the broadcast source is a direct broadcast satellite (DBS) source.

19. The automated process of claim 17 wherein the television receiver device automatically initiates the recording of the broadcast containing the same particular program in response to the signal without express interaction with the user so that the same particular program is ready for viewing when the user later interacts with the set top box.

20. The automated process of claim 17 wherein the set top box determines that portions of the copy of the particular program automatically buffered in the data storage include commercials that may be skipped, and normalizes the output of the set-top box to a live broadcast of the media content when the commercials are skipped.

* * * * *